United States Patent [19]

Krolla

[11] 3,960,578

[45] June 1, 1976

[54] ARSENIC PENTOXIDE GLASSES

[75] Inventor: Georg Krolla, Mainz-Mombach, Germany

[73] Assignee: Jenaer Glaswerk Schott & Gen., Mainz, Germany

[22] Filed: Jan. 19, 1973

[21] Appl. No.: 324,992

[30] Foreign Application Priority Data

Jan. 20, 1972 Germany............................ 2202652

[52] U.S. Cl. ............................................. 106/47 Q
[51] Int. Cl.² ...................... C03C 3/12; C03C 3/18; C03C 3/30
[58] Field of Search ....................... 106/47 R, 47 Q

[56] References Cited
UNITED STATES PATENTS 3,615,764   10/1971   Krolla ............................. 106/47 Q

*Primary Examiner*—Winston A. Douglas
*Assistant Examiner*—Mark Bell
*Attorney, Agent, or Firm*—Millen, Raptes & White

[57] ABSTRACT

Arsenic pentoxide glasses characterized by containing 8 – 60 wt.% arsenic pentoxide and correspondingly 92 – 40 wt.% polyvalent metal fluorides exhibit improved processing characteristics while maintaining outstanding optical properties when prepared from a formula containing at least 0.5% of at least one member selected from the group consisting of bromides, chlorides, sulfates and metal oxides.

25 Claims, 2 Drawing Figures

ARSENIC PENTOXIDE GLASSES

BACKGROUND OF THE INVENTION

This invention relates to optical quality glasses. More particularly, this invention relates to optical quality glasses comprising arsenic pentoxide and at least one inorganic fluoride.

German Auslegeschrift 1,771,080 describes arsenic pentoxide glasses of good stability and with extreme optical properties, which are characterized by containing 8 – 60 wt.% of arsenic pentoxide and correspondingly 92 – 40 wt.% simple or complex inorganic fluorides. German Auslegeschrift 1,771,080 corresponds to U.S. Pat. No. 3,615,764 the contents of which are incorporated by reference herein.

These glasses are ideally suitable for the construction of objectives (apochromats) and for use in infrared optical systems. They have, inter alia, the outstanding properties of high light transmissivity over a wide range of the spectrum; optical positions covering a wide range; extreme partial dispersion values; and are capable of being fused in platinum crucibles.

However, these glasses present considerable difficulties in the production of articles having satisfactory optical bubble and schlieren quality, particularly in large dimensions. These difficulties are chiefly due to the temperature range in which the glasses have to be melted, refined and homogenized, which range is unusually small for optical glasses. Because of the sublimation properties of arsenic pentoxide, the melting temperatures have a maximum at 1,000° C. and, because of rapid increase in viscosity of the glass with falling temperature and the behavior thereof on crystallisation, a minimum melting temperature at 700° C.

OBJECTS OF THE INVENTION

Accordingly, it is a general object of this invention to provide improved arsenic pentoxide/inorganic fluoride optical glasses.

Another object of this invention is to provide arsenic pentoxide/inorganic fluoride glasses which can be melted in technical scale platinum crucibles.

A further object of this invention is to provide glasses which can be cast into large shaped objects satisfactorily free of bubbles, stones and chemical inhomogenity which would form cords or striae.

An additional object of this invention is to provide glasses having improved devitrification and viscosity properties.

Upon further study of the specification and appended claims, further objects and advantages of this invention will become apparent to those skilled in the art.

SUMMARY OF THE INVENTION

Briefly, the above and other objects are attained in one aspect of the present invention by providing, in an optical glass formed by fusing a mixture of 8 – 60 wt.% arsenic pentoxide and correspondingly 92 – 40 wt.% of one or more simple or complex inorganic multivalent metal fluorides at a temperature below 1,000° C., the improvement which comprises at least 0.5 wt.% of at least one member selected from the group consisting of bromides, chlorides, sulfates and metal oxides in an amount sufficient to reduce the devitrification tendency and flatten the temperature/viscosity curve of said glass, provided that the metal oxide content of said glass is greater than 5 wt.% when the glass contains no bromide, chloride or sulfate.

BRIEF DESCRIPTION OF THE DRAWINGS

The above and other objects will become more fully apparent to those skilled in the art from the following detailed discussion, taken with the annexed Drawings, wherein.

DETAILED DISCUSSION

Figure 1:
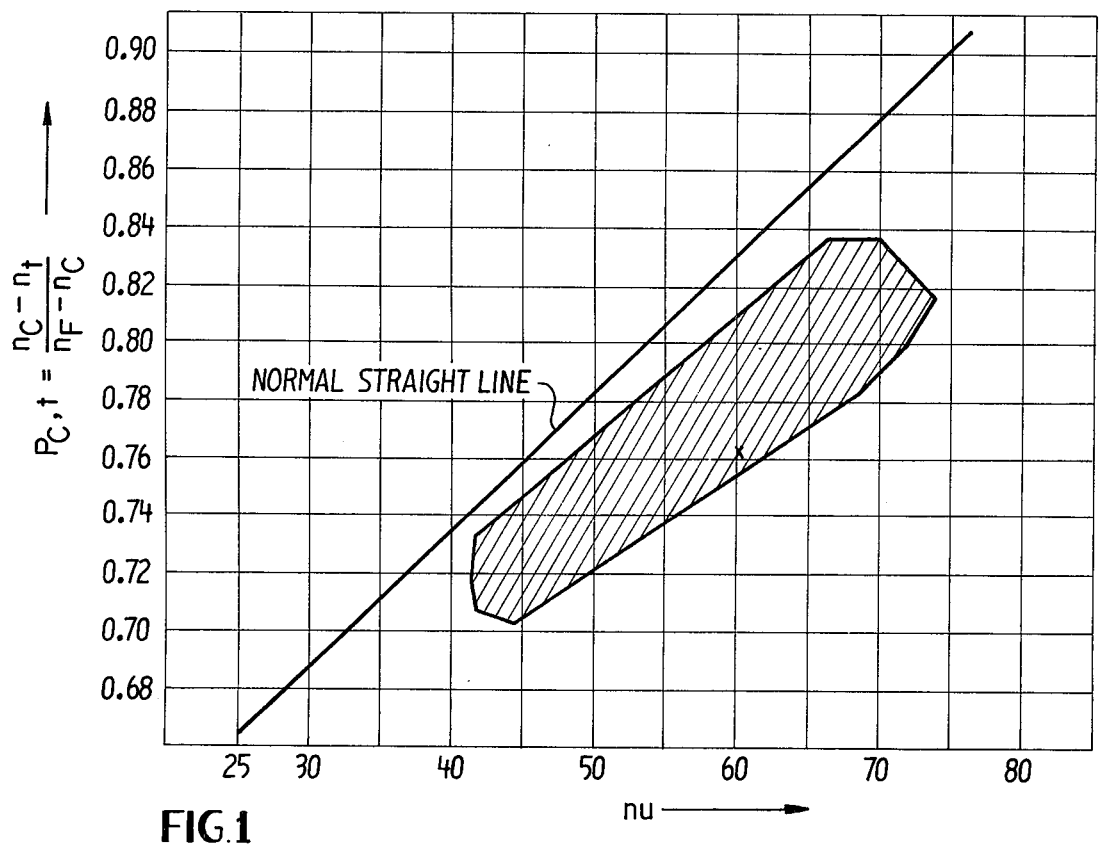
FIG. 1 is a graph of the partial dispersion ratio C,t of a glass according to this invention plotted against the nu value $(n_D - 1)/(n_F - n_C)$.

It has now been found that arsenic pentoxide glasses can be melted in large dimensions and satisfactory optical quality if the glasses of the type disclosed in Auslegeschrift 1,771,080 are melted with one or more of the following additives:

1. Chlorine in the form of chlorides, and/or
2. Bromine in the form of bromides, and/or
3. Sulphur in the form of sulphates, and/or
4. Metal oxides.

The content of the additives in the glass formula is calculated so that it is unnecessary to raise the melting temperature thereof above 1,000° C. These additives have the advantageous effect of both reducing the tendency to crystallisation and of flattening the glass viscosity curves without substantially influencing the outstanding optical properties of these glasses.

The glasses according to the invention are thus melted from arsenic pentoxide, simple or complex inorganic polyvalent metal fluorides, and additionally one or more of a) simple or complex inorganic chlorides or oxychlorides; b) metal bromides; c) sulphates; and d) metal oxides. The additions are so calculated so that the maximum melting temperature of 1,000° C. is not exceeded. Preferably, these additives and the various combinations thereof are incorporated into the glass recipe, as are the arsenic pentoxide and polyvalent metal fluorides, in the anhydrous state. The additives are incorporated in an amount sufficient to reduce the devitrification tendencies of the glass while simultaneously flattening the temperature vs. viscosity curve thereof, but the amounts added must not raise the maximum melting temperature of the glass composition above 1,000° C. While it will be appreciated that the particular nature and amount of additives to be incorporated will vary according to the arsenic pentoxide and polyvalent metal fluoride content of the glass and the ultimate intended use and correspondingly desired physical and optical properties in the final product, the sulfate and/or metal oxide is added in partial exchange for arsenic pentoxide, while the bromide and/or chloride is added in partial exchange for the polyvalent metal fluoride. The sum of the arsenic pentoxide, metal oxide, sulfate and bromide in the glass is 12 – 60 wt.%, preferably 30 – 50 wt.%; at least 0.5 wt.%, preferably at least 2.0 wt.%. of additive is required except in formulations lacking in bromide, chloride or sulfate in which case the metal oxide additive content is greater than 5 wt.%, preferably greater than 7.5 wt.%. In German Auslegeschrift 1,771,080, the metal oxide content of the arsenic pentoxide glasses is kept below 5 wt.% in order to keep the deviation of the relative partial dispersions from the straight "normal" line as high as possible.

Generally, 1 – 20 %, and preferably 3 – 16 % of the arsenic pentoxide is substituted by at least one sulfate and/or metal oxide, while generally 1 – 55%; and preferably 2 – 35 % of the polyvalent metal fluoride is substituted by at least one bromide and/or chloride.

Preferred arsenic pentoxide glasses useful in the present invention are those meeting one or more of the following criteria:
a. Glasses containing 30 – 90 wt.% aluminum fluoride and alkaline earth metal fluorides.
b. Glasses containing at least 2 wt.% of $AlF_3$ and at least 15 wt.% alkaline earth fluorides.
c. Glasses containing 30 – 75 wt.% alkaline earth fluorides.
d. Glasses containing 5 – 35 wt.% $AlF_3$.
e. Glasses containing up to 35 wt.% lead fluoride.
f. Glasses containing $ZnF_2$ and $CdF_2$, $BiF_3$ and rare earth fluorides, yttrium fluoride, thorium and titanium fluoride compounds, zirconium, niobium, tantalum and tungsten.
g. Glasses containing silicon tetrafluoride up to 20 wt.%.
h. Glasses containing over 5 wt.% metallic oxides.
i. Glasses containing equal amounts by weight of calcium fluoride and aluminum fluoride, particularly those meeting one or more of the above criteria.
j. Glasses containing $B_2O_3$, $La_2O_3$, $In_2O_3$, and KBr.
k. Glasses containing $TeO_2$.
l. Glasses containing PbO.
m. Glasses containing $WO_3$.
n. Glasses containing $PbSO_4$.
o. Glasses containing CdO.
p. Glasses containing $Bi_2O_3$.

The chlorine is advantageously incorporated by using 0 – 55 wt.%, preferably 5 – 40 wt.% of at least one simple or complex chloride of the alkali metals or of the alkaline-earth metals; up to 55% by weight of the chlorine can be provided by the simple or complex chlorides or oxychlorides of In, Pb, Bi, Zn, Cd, Y, lanthanides, Nb, Ta, Zr and Th. The proportion of the alkali chlorides is up to 8 wt.%, preferably 1 – 5 wt.%.

The bromine is advantageously incorporated by the addition of 0.5 – 6 wt.% of LiBr, NaBr, KBr, RbBr, CsBr and/or the addition of 1 – 12 wt.% of the bromides of cerium, lanthanum and the other rare earths.

The sulfur is advantageously incorporated by the addition of alkaline-earth metal sulfates, e.g., in an amount of up to 6% by weight by the sulfates of Mg, Ca, Sr, Ba, likewise of up to 8% by weight by the sulfates of Zn, Cd, Al, In, La, lanthanides, Pb and Tl. The sulfates of the alkali metals are generally added in an amount of about 5% by weight to the batch.

Among the metal oxides, those of Pb, W, Bi, Te, In, Cd and B are advantageously used. Particularly stable glasses can be melted by addition of the following metal oxides:
up to 12% by weight of $In_2O_3$, e.g., 2 – 8 %
up to 12% by weight of $Ga_2O_3$, e.g., 2 – 8 %
up to 25% by weight of $B_2O_3$, e.g., 2.5 – 75 %
up to 15% by weight of $WO_3$, e.g., 7 – 70 %
up to 15% by weight of PbO, e.g., 5 – 70 %
up to 15% by weight of CdO, e.g., 5 – 70 %
up to 15% by weight of $Bi_2O_3$, e.g., 2 – 70 %
up to 25% by weight of $TeO_2$, e.g., 5 – 75 %

The sum of the oxides, including arsenic pentoxide, and of the sulfates and bromides in the glasses according to the invention is not to exceed 60% by weight. The minimum content of this sum is 12% by weight. If the glass contains no bromide, chloride or sulfate, the content of metal oxide additives is more than 5% by weight, preferably more than 7.5 % by weight.

The content of alkali and/or alkaline-earth oxides amounts advantageously to at most 5% by weight.

Without further elaboration, it is believed that one skilled in the art can, using the preceding description, utilize the present invention to its fullest extent. The following preferred embodiments are, therefore, to be construed as merely illustrative, and not limitative of the remainder of the disclosure in any way whatsoever.

EXAMPLES

Glasses were melted from the following batches, and the optical values of said glasses are likewise indicated. The quantities are indicated in grams.

| Example No. | 1 | 2 |
|---|---|---|
| $As_2O_5$ | 32.8 | 25.0 |
| $BaF_2$ | 32.3 | 25.0 |
| $CaF_2$ | 14.2 | 24.0 |
| $AlF_3$ | 14.2 | 24.0 |
| $LaBr_3$ | 6.5 | — |
| KBr | — | 2.0 |
| $n_d$ | 1.5839 | 1.5119 |
| $v_d$ (nu value) | 59.5 | 68.7 |

| Example No. | 3 | 4 |
|---|---|---|
| $As_2O_5$ | 25.0 | 30.0 |
| $BaF_2$ | 21.0 | 54.0 |
| $CaF_2$ | 25.0 | 6.0 |
| $AlF_3$ | 25.0 | 6.0 |
| $BaSO_4$ | 4.0 | — |
| $PbSO_4$ | — | 4.0 |
| $n_d$ | 1.5228 | 1.6081 |
| $v_d$ (nu value) | 68.4 | 51.8 |

| Example No. | 5 | 6 | 7 |
|---|---|---|---|
| $As_2O_5$ | 45.0 | 22.2 | 23.0 |
| $BaF_2$ | 30.0 | 22.2 | 23.0 |
| $CaF_2$ | 7.5 | 22.2 | 18.5 |
| $AlF_3$ | 7.5 | 22.2 | 18.5 |
| $TeO_2$ | 10.0 | — | 1.0 |
| $La_2O_3$ | — | 4.5 | — |
| $WO_3$ | — | 6.7 | 1.0 |
| PbO | — | — | 8.0 |
| $B_2O_3$ | — | — | 7.0 |
| $n_d$ | 1.6889 | 1.5419 | 1.5896 |
| $v_d$ (nu value) | 40.19 | 62.1 | 53.2 |

| Example No. | 8 | 9 |
|---|---|---|
| $As_2O_5$ | 31.0 | 24.0 |
| $BaF_2$ | 34.0 | 18.0 |
| $CaF_2$ | 14.5 | 25.0 |
| $AlF_3$ | 14.5 | 25.0 |
| $In_2O_3$ | 3.0 | — |
| $LaBr_3$ | 3.0 | — |
| $ZnSO_4$ | — | 6.0 |
| KBr | — | 2.0 |
| $n_d$ | 1.5834 | 1.5253 |
| $v_d$ (nu value) | 57.7 | 67.1 |

| Example No | 10 | 11 |
|---|---|---|
| $As_2O_5$ | 35.0 | 34.0 |
| $CaF_2$ | 10.0 | 20.0 |
| $AlF_3$ | 10.0 | 20.0 |
| $BaCl_2$ | 35.0 | 26.0 |
| $BaF_2$ | 10.0 | — |
| $n_d$ | 1.6403 | 1.5601 |
| $v_d$ (nu value) | 50.76 | 63.11 |

Example No. 12
Batch for 20 kg. of glass

| | |
|---|---|
| $B_2O_3$ | 1100 g |
| $La_2O_3$ | 400 g |
| $In_2O_3$ | 400 g |
| $AlF_3$ | 3000 g |

-continued

| | |
|---|---|
| CaF$_2$ | 3000 g |
| BaF$_2$ | 7000 g |
| KBr | 200 g |
| As$_2$O$_5$ | 5100 g |

Figure 2:
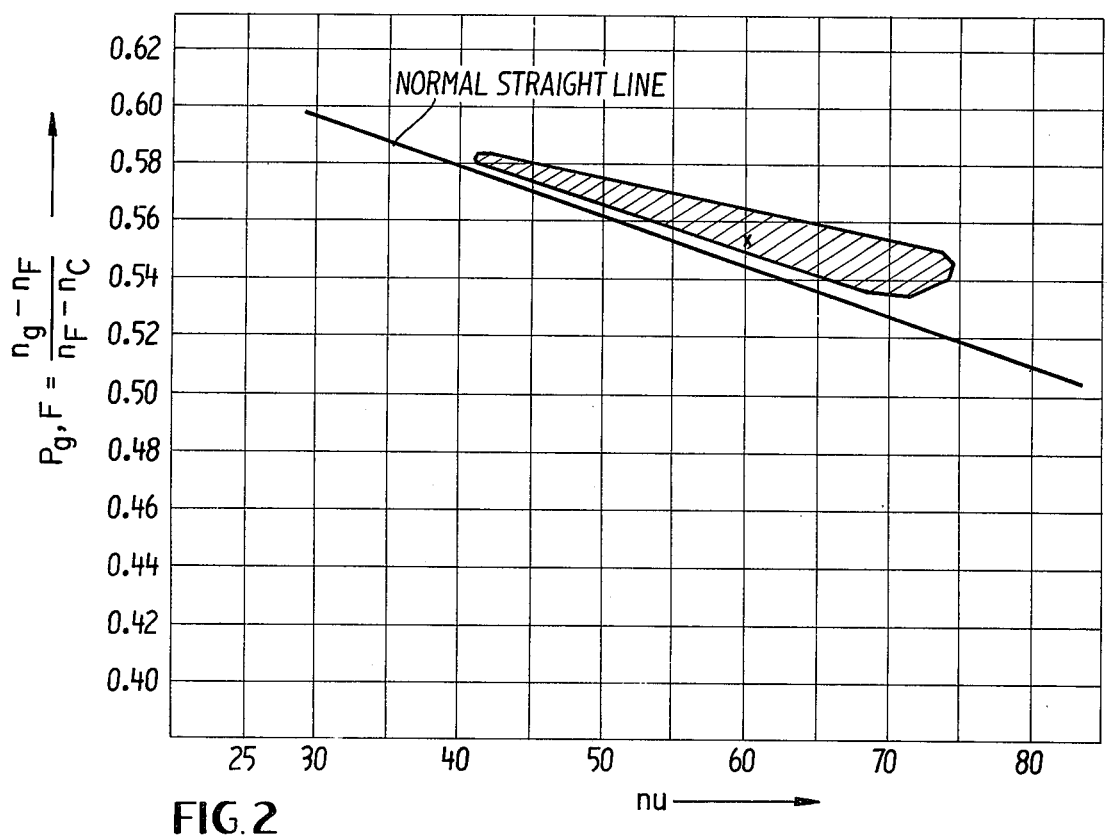
FIG. 2 is a similar graph of the partial dispersion ratio g,F.

FIGS. 1 and 2 show the optical position of glasses according to the invention. The position of the glass melted in accordance with Example 12 procedure is indicated by (x).

The raw materials were charged into a melting section and melted at 900° C. for 6 hours. The resultant molten glass or metal was refined for 2 hours at 880° – 850° C. and stirred at 850° – 770° C. before being cast at 770° C. The cast glass was cooled to 520° C. over a cooling time of about 75 hours. Physical properties of the resultant glass were determined according to standard test materials and are set forth below; the letter symbols refer to Abbe spectral lines.

MEASUREMENT DATA

Density = 4.15 g/cm$^3$
$\alpha \cdot 10^7$ (20–300° C) = 136
$n_d$ = 1.5890
$v_d$ = 60.60
Relative partial dispersions
$\frac{n_d - n_C}{n_F - n_C} = 0.3003$   $\frac{n_e - n_d}{n_F - n_C} = 0.2383$
$\frac{n_F - n_e}{n_F - n_C} = 0.4614$   $\frac{n_g - n_F}{n_F - n_C} = 0.5534$
$\frac{n_g - n_e}{n_F - n_C} = 1.0148$ The preceding examples can be repeated with similar success by substituting the generically or specifically described reactants and/or operating conditions of this invention for those used in the preceding examples.

From the foregoing, one skilled in the art can easily ascertain the essential characteristics of this invention, and without departing from the spirit and scope thereof, can make various changes and modifications of the invention to adapt it to various usages and conditions.

What is claimed is:

1. In an optical glass formed from a mixture of 8–60 wt. % arsenic pentoxide and correspondingly 92–40 wt. % of one or more simple or complex inorganic polyvalent metal fluorides, said mixture having a melting temperature of not more than 1,000°C., the improvement in said glass which comprises a partial exchange in said mixture of at least 0.5 wt. % of at least one member selected from the group consisting of
   a. 0.5–6 wt. % of LiBr, NaBr, KBr, RbBr, CsBr and/or 1–12 wt. % of a rare earth bromide,
   b. a chloride of an alkali metal, an alkaline earth metal, In, Pb, Bi, Zn, Cd, Y, a lanthanide, Nb, Ta, Zr or Th, the proportion of alkali metal chloride being up to 8 wt. %,
   c. sulfate of an alkaline earth metal, alkali metal, Zn, Cd, Al, In, La, a lanthanide, Pb or Tl, and
   d. an oxide of a polyvalent metal selected from the group consisting of In, Ga, B, Pb, Bi, W, Te, Tl, Cd and mixtures thereof,
   provided that the metal oxide content of said glass is greater than 7.5 wt. % when the glass contains no bromide, chloride or sulfate, and the partial exchange being such that the bromide and chloride are exchanged for the polyvalent metal fluoride, the maximum amount of bromide being 12 wt. % and the maximum amount of chloride being 55 wt. %; and the sulfate and the polyvalent metal oxide are exchanged for the arsenic pentoxide, the maximum amount of sulfate being 9 wt. % and the maximum amount of polyvalent metal oxide being 25 wt. %, the sum of the arsenic pentoxide, polyvalent metal oxide, sulfate and bromide in the glass being 12–60 wt %, and that the partial exchange is such that the maximum melting temperature of 1,000°C. is not exceeded, whereby said partial exchange results in a reduction of the devitrification tendency and in a flattening of the temperature viscosity curve of said glass.

2. A glass according to claim 1 wherein said at least one member is bromide.

3. A glass according to claim 1 wherein said at least one member is chloride.

4. A glass according to claim 3 wherein said chloride is a single or complex chloride of an alkali metal or alkaline earth metal.

5. A glass according to claim 1 wherein the combined content of alkali and alkaline earth metal oxides does not exceed 5 wt.%.

6. A glass according to claim 1 wherein said at least one member is said sulfate.

7. A glass according to claim 6 wherein said sulfate comprises up to 6 wt.% of at least one member selected from the group consisting of the sulfates of Mg, Ca, Sr and Ba.

8. A glass according to claim 6 wherein said sulfate comprises up to 5 wt.% of at least one alkali metal sulfate.

9. A glass according to claim 1 wherein said glass contains equal amounts by weight of AlF$_3$ and CaF$_2$.

10. A glass according to claim 1 wherein said at least one member is said polyvalent metal oxide.

11. A glass according to claim 10 wherein said metal oxide is selected from at least one member of the group consisting of:
    up to 12% by weight of In$_2$O$_3$
    up to 12% by weight of Ga$_2$O$_3$
    up to 25% by weight of B$_2$O$_3$
    up to 15% by weight of PbO
    up to 15% by weight of Bi$_2$O$_3$
    up to 20% by weight of WO$_3$
    up to 25% by weight of TeO$_2$
    up to 10% by weight of Tl$_2$O
in partial exchange for arsenic pentoxide.

12. A glass according to claim 10 containing PbO.

13. A glass according to claim 10 containing WO$_3$.

14. A glass according to claim 10 containing CdO.

15. A glass according to claim 10 containing Bi$_2$O$_3$.

16. A glass according to claim 1 containing B$_2$O$_3$, La$_2$O$_3$, In$_2$O$_3$ and KBr.

17. A glass according to claim 1 containing TeO$_2$.

18. A glass according to claim 11 containing 2 – 8 wt. % In$_2$O$_3$.

19. A glass according to claim 11 containing 2 – 8 wt. % Ga$_2$O$_3$.

20. A glass according to claim 11 containing 2.5 – 15 wt. % B$_2$O$_3$.

21. A glass according to claim 11 containing 1 – 10 wt. % WO$_3$.

22. A glass according to claim 11 containing 5 – 10 wt. % PbO.

23. A glass according to claim 11 containing 5 – 10 wt. % CdO.

24. A glass according to claim 11 containing 2 – 10 wt. % Bi$_2$O$_3$.

25. A glass according to claim 11 containing 5 – 15 wt. % TeO$_2$.

* * * * *